US012485468B2

(12) United States Patent
Tränklein et al.

(10) Patent No.: US 12,485,468 B2
(45) Date of Patent: Dec. 2, 2025

(54) READJUSTMENT DEVICE AND READJUSTMENT METHOD FOR A PLATE-LIKE WORKPIECE IN A PROCESSING MACHINE

(71) Applicant: TRUMPF WERKZEUGMASCHINEN SE + CO. KG, Ditzingen (DE)

(72) Inventors: Dennis Tränklein, Kirchberg-Thening (AT); Tino Hager, Stuttgart (DE); Christoph Preisser, Niedernhall (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 253 days.

(21) Appl. No.: 18/335,330

(22) Filed: Jun. 15, 2023

(65) Prior Publication Data

US 2023/0330736 A1 Oct. 19, 2023

Related U.S. Application Data

(63) Continuation of application No. PCT/EP2021/084199, filed on Dec. 3, 2021.

(30) Foreign Application Priority Data

Dec. 17, 2020 (DE) ..................... 10 2020 133 999.2

(51) Int. Cl.
*B21D 43/11* (2006.01)
*B25B 5/06* (2006.01)
*B25B 5/14* (2006.01)

(52) U.S. Cl.
CPC .............. *B21D 43/11* (2013.01); *B25B 5/061* (2013.01); *B25B 5/145* (2013.01)

(58) Field of Classification Search
CPC ..... B21D 43/003; B21D 43/11; B25B 5/0061; B25B 5/145
See application file for complete search history.

(56) References Cited

U.S. PATENT DOCUMENTS 3,718,216 A 2/1973 Wilson
4,621,516 A * 11/1986 Schafer ................ B21D 43/055 72/422

(Continued)

FOREIGN PATENT DOCUMENTS

CN 201960050 U 9/2011
CN 105689580 A 6/2016

(Continued)

*Primary Examiner* — Saul Rodriguez
*Assistant Examiner* — Brendan P Tighe
(74) *Attorney, Agent, or Firm* — Laurence A. Greenberg; Werner H. Stemer; Ralph E. Locher

(57) ABSTRACT

A readjustment device and a method for a machine tool process plate-shaped workpieces. The readjustment device contains an upper pressure-exerting device, which at least contains pressure plungers which are oriented at a spacing to one another, and a lower supporting device, which at least has counter-bearings which are arranged at a spacing to one another and which, in a working position, are oriented so as to fix the plate-like workpiece in a clamping manner with respect to the pressure plungers of the upper pressure-exerting device. The pressure plungers of the upper pressure-exerting device can be transferred from a rest position to the working position by a drive device. The pressure plungers of the upper pressure-exerting device are being coupled to one another and are controlled so as to be movable or pivotable together between the rest position and the working position.

34 Claims, 10 Drawing Sheets

(56) References Cited

U.S. PATENT DOCUMENTS

| | | | | | |
|---|---|---|---|---|---|
| 4,706,491 | A * | 11/1987 | Sartorio | B21D 5/0281 901/6 |
| 5,058,406 | A * | 10/1991 | Sartorio | B21D 5/0281 72/422 |
| 6,938,454 | B2 * | 9/2005 | Strasser | B21D 5/02 72/422 |
| 2013/0119595 | A1 | 5/2013 | Duffner | |
| 2013/0160508 | A1 * | 6/2013 | Fischereder | B21D 43/26 72/6.1 |
| 2019/0217361 | A1 | 7/2019 | Wilhelm et al. | |
| 2019/0388954 | A1 * | 12/2019 | Stauffer | B21D 43/026 |

FOREIGN PATENT DOCUMENTS

| | | | | |
|---|---|---|---|---|
| CN | 104550536 | B | 9/2016 | |
| CN | 107812845 | A | 3/2018 | |
| CN | 108746383 | A | 11/2018 | |
| DE | 2046527 | A1 | 3/1972 | |
| DE | 3546859 | C2 | 8/1999 | |
| EP | 0156787 | A2 | 10/1985 | |
| EP | 0935516 | A1 | 8/1999 | |
| EP | 3103558 | A1 | 12/2016 | |
| JP | H05138273 | A | 6/1993 | |
| JP | H07112228 | A | 5/1995 | |
| JP | H08243968 | A | 9/1996 | |
| JP | 2002001464 | A | 1/2002 | |
| JP | 2008068291 | A | 3/2008 | |
| WO | 9815392 | A1 | 4/1998 | |
| WO | 2006045205 | A1 | 5/2006 | |
| WO | WO-2020245487 | A1 * | 12/2020 | B21D 43/05 |

* cited by examiner

READJUSTMENT DEVICE AND READJUSTMENT METHOD FOR A PLATE-LIKE WORKPIECE IN A PROCESSING MACHINE

CROSS-REFERENCE TO RELATED APPLICATION

This application is a continuation, under 35 U.S.C. § 120, of copending International Patent Application PCT/EP2021/084199, filed Dec. 3, 2021, which designated the United States; this application also claims the priority, under 35 U.S.C. § 119, of German Patent Application DE 10 2020 133 999.2, filed Dec. 17, 2020; the prior applications are herewith incorporated by reference in their entirety.

FIELD AND BACKGROUND OF THE INVENTION

The invention relates to a readjustment device for a plate-like workpiece in a machine tool for processing the plate-like workpieces, and also to a method for readjusting a plate-like workpiece for processing in a machine tool.

Chinese patent CN 104550536 B discloses a machine tool for processing plate-like workpieces by punching. This machine tool contains an upper tool and a lower tool, in order to process a plate-like workpiece lying on a workpiece rest. The plate-like workpiece is held by a feed device by means of grippers and is moved relative to the punching tool for processing purposes. In order to obtain complete processing of the plate-like workpiece, it is necessary for the plate-like workpiece to be readjusted, meaning that gripping of the gripping elements of the feed device relative to the plate-like workpiece along an axis of a working plane is effected. During the readjustment, it is necessary for the plate-like workpiece to be fixed with respect to the workpiece rest. For this, two hydraulically controllable cylinders arranged at a spacing to one another and at a spacing to the punching tool are provided. Provided at the extendable end of the piston rod are pressure pieces which are fed to counter-bearings which are positioned in the workpiece rest, in order to obtain clamping of the plate-like workpiece.

The two lifting cylinders which can be controlled independently of one another and the counter-bearings which lie opposite to the pressure pieces form the readjustment device.

This readjustment device has the disadvantage that it is not possible to generate large forces for fixing of the plate-like material. In addition, these cylinders require a large installation space, in particular a large structural height.

SUMMARY OF THE INVENTION

The invention is based on the object of proposing a readjustment device for a machine tool for processing plate-like workpieces, the readjustment device enabling a large holding force for the fixing of the plate-like workpiece in order to increase the process safety. Furthermore, the invention is based on the object of proposing a method for readjusting a plate-like workpiece for processing in a machine tool, by which the position of the plate-like workpiece is maintained by means of a high holding force in order to increase the process safety.

This object is achieved by means of a readjustment device for a machine tool for processing plate-like workpieces, in which an upper pressure-exerting device, which contains at least two pressure plungers which are arranged at a spacing to one another. The at least two counter-bearings of a lower supporting device which are arranged at a spacing to one another can be positioned so as to lie opposite to the pressure plungers, and containing a drive device, by means of which the pressure plungers of the pressure-exerting device can be transferred from a rest position to a working position. The at least two pressure plungers of the upper pressure-exerting device being coupled to one another and being movable or pivotable together between the rest position and the working position. The coupling of the at least two pressure plungers, which are transferred together, in particular simultaneously or successively, from a rest position to a working position, makes it possible for these pressure plungers to act on the plate-like workpiece with the respectively same pressure force or pressing force, in order to fix, by clamping, the plate-like workpiece with clamping with respect to the respective counter-bearings which lie opposite to the pressure pieces. This furthermore makes it possible to prevent a rotational movement of the plate-like workpiece about a Z axis, that is to say a rotational movement in an X-Y plane, on the workpiece rest during the release and implementation of grippers of a feed device. In addition, due to the movable arrangement from the rest position to the working position, this coupling of the at least two pressure plungers of the upper pressure-exerting device has the advantage that a compact structural height can be obtained, with the result that further components of the machine tool, such as, for example, a removal device containing a gripper device, can be inserted and can be positioned between an upper tool and the plate-like workpiece in order to remove workpiece parts produced from the plate-like workpiece.

According to an advantageous configuration of the readjustment device, the at least two pressure pieces can be moved synchronously by a joint or coupling mechanism. This enables simplified control of the two pressure plungers so that they can be moved together and simultaneously for application of a holding force to the plate-like workpiece.

Preferably, at least two pressure pieces of the upper pressure-exerting device can be controlled by means of the joint mechanism, in which the pressure pieces are arranged on the output side and the at least one drive device is arranged on the input side. By way of such a joint mechanism, it is possible for the at least one drive device to control a defined travel movement or pivoting movement of the pressure pieces between the rest position and the working position.

Furthermore, preferably, the pressure plungers are oriented facing the plate-like workpiece, in particular oriented perpendicular to the plate-like workpiece, in the working position and are moved upward or pivoted laterally with respect to the plate-like workpiece in a rest position. As a result, outside of the readjustment process, when the readjustment device is not in use, accessibility to the plate-like workpiece and an increased free space between the upper tool and the plate-like workpiece are provided.

Furthermore, the lower supporting device is preferably configured to be decoupled or separated from the upper pressure-exerting device. This enables a simplified structural design and a simplified mounting of the readjustment device in the machine tool.

Advantageously, the pressure plunger of the upper pressure-exerting device contains a cylindrical housing in which a pressure pin is arranged in a spring-mounted manner. This pressure pin is guided so as to be able to dip into the housing counter to a flexible element when a clamping force is applied to the plate-like workpiece. As a result, it is possible, firstly, to apply a sufficiently predetermined pressing force, and, secondly, to compensate for tolerances.

A force store element, in particular a preloaded spring assembly, for applying the force, in particular spring force, via the pressure pin is preferably provided in the housing of the pressure plunger. Advantageously, a disk spring assembly is provided, which is preloaded, as a result of which a defined increase in force can be obtained in the event of an advancing movement.

The upper pressure-exerting device of the readjustment device preferably has a main body or a holding element on which two pivot axles, which are oriented in a parallel manner, for the pivotable arrangement of the pressure plungers are provided at a spacing. The pivot axles being able to be used to move the pressure plungers from a retracted rest position to an extended working position. This pivotable arrangement of the pressure plungers on the main body of the pressure-exerting device makes it possible to obtain a low or compact structural height in the rest position. In addition, the transferring of the pressure plungers to the extended working position makes it possible for the longitudinal axis of the pressure plungers to lie for example in the Z axis, in order to then obtain a high clamping force in the event of an advancing movement of the upper tool for clamping of the plate-like workpiece.

On the upper pressure-exerting device, the pivot axles are preferably provided at a spacing to one another on the main body or on the holding element, with the result that the pressure plungers lie one behind the other in the retracted rest position, in particular are arranged so as to lie in a row and preferably are oriented in a horizontally oriented line. As a result, the upper pressure-exerting device has a low height and low width.

Furthermore, in the extended working position, the pressure plungers preferably bear against an end stop which delimits the pivoting movement. This makes it possible, in the event of a stroke movement of the upper tool, for force to be transmitted directly from the upper tool via the main body and the end stop to the pressure plunger.

Advantageously, the drive device is rotatably mounted on the main body of the upper pressure-exerting device and controls the joint mechanism for retraction and extension of the pressure plungers between the rest position and working position. As a result, the upper pressure-exerting device is in the form of a mounting assembly.

The drive device preferably contains a reciprocating piston with an extendable piston rod by means of which the joint mechanism is controlled. This reciprocating piston may be controllable hydraulically, pneumatically or electromagnetically. As an alternative, the drive device may also be in the form of a gear mechanism, a cam control system or a linear drive.

Advantageously, a toggle lever mechanism is provided between a sliding member or lever arm of the joint mechanism, the sliding member or lever arm engaging with the pressure plunger, and the drive device. As a result, it is in particular possible for force assistance to be effected when transferring the pressure plungers to the rest position.

The upper pressure-exerting device of the readjustment device preferably has, on the main body or holding element, a connection interface lying opposite to the pressure plungers, the connection interface being able to be used to releasably fasten the pressure-exerting device to an upper stroke drive apparatus or an upper tool of the machine tool. This enables simple and rapid mounting of such an upper pressure-exerting device.

Furthermore, a readjustment position between a housing and a pressure pin of the pressure plunger can preferably be set. This may be effected, for example, by distance compensation elements or the like. By way of example, the pressure pin may be of two-part form, such that distance compensation elements can be arranged so as to lie therebetween.

Furthermore, as an alternative, the readjustment position of the pressure plunger arranged in a working position may be settable between the upper stroke drive device and an interface of the upper pressure-exerting device. Preferably, it is likewise possible for distance compensation elements with preferably predefined gradations in terms of thickness to be arrangeable so as to lie therebetween.

Furthermore, in order to receive the at least two counter-bearings, the lower supporting device preferably has a supporting frame which can be fastened to the lower stroke drive device or the lower tool. This supporting frame is preferably of stiff form, in order to in particular avoid a deflection in the plane of the workpiece rest.

The counter-bearings of the lower supporting device may be in the form of rigid counter-bearings according to a first embodiment. As an alternative, lowerable counter-bearings may also be used. As a result of the configuration of lowerable counter-bearings, scratch-free processing can be made possible in particular in the case of softer plate-like workpieces.

The object on which the invention is based is furthermore achieved by means of a method for readjusting a plate-like workpiece for processing in a machine tool, in which, in order to readjust the plate-like workpiece between two processing cycles in which the plate-like workpiece is processed using tools, a readjustment process is carried out by means of a readjustment device according to one of the above-described embodiments. This method has the advantage that the pressure plungers of the readjustment device are moved toward the counter-bearing of the lower supporting device and are simultaneously placed onto the plate-like workpiece, in order to clamp the plate-like workpiece therebetween. As a result, it is possible for a secure clamping position to be assumed and maintained in order to carry out the readjustment process by a movement of a feed device, which grips the plate-like workpiece during processing thereof and which moves at least along the X axis, at least along an X axis of a workpiece rest.

It is preferably provided that, at the beginning of the readjustment cycle, the plate-like workpiece is held in a fixed manner by the readjustment device in a position with respect to the workpiece rest and a gripping position of a feed device with respect to the plate-like workpiece is released and the feed device is moved in relation to the plate-like workpiece by a readjustment travel and the plate-like workpiece is fixed in the gripping position, which has changed by the readjustment travel, by the grippers of the feed device. As a result, it is possible in particular in the case of long plate-like workpieces, the length of which is greater than a movement travel of the feed device, for complete processing of the plate-like material to be effected.

Furthermore, in a first working step of the readjustment process, the upper pressure-exerting device of the readjustment device is preferably moved to an upper end position with respect to the machine frame and the at least two pressure plungers are subsequently transferred from a rest position to a working position. As a result, reliable extension or pivoting of the pressure plungers to the working position can be made possible, without colliding with the plate-like workpiece 10.

In a subsequent working step of the readjustment process, the upper pressure-exerting device is preferably moved toward the plate-like workpiece and the plate-like workpiece is held in a clamped manner between the upper pressure-exerting device and the lower supporting device. The movement of the upper pressure-exerting device along the Z axis makes it possible to obtain tilt-free placement of the at least two pressure plungers.

Subsequently, preferably, after the plate-like workpiece has been fixed in a clamping manner by the readjustment device, the grippers of the feed device are opened and the plate-like workpiece is controlled to move away from the grippers of the feed device along the Y axis. As a result of this moving away from the grippers, in particular out of the clamping jaws of the grippers, straightness errors of a side edge of the plate-like workpiece are during the performance of a readjustment travel without influencing the clamping position of the plate-like workpiece in the readjustment device. When moving away the plate-like workpiece, that end side of the plate-like workpiece which points toward the gripper is not preferably guided completely out of a clamping jaw of the grippers, but rather only removed from a zero stop which lies in the clamping jaw.

After the plate-like workpiece has been moved away from the gripper, the feed device is preferably moved along the adjustment travel and the plate-like workpiece is subsequently controlled to move toward the grippers of the feed device. It is thus possible for the plate-like workpiece to once again be introduced in a clamping jaw of the grippers, in order to provide an enlarged engagement surface for fixing of the plate-like workpiece.

In particular, in the case of a first readjustment process, the movement travel when moving the plate-like workpiece away from the grippers is controlled to be greater than the movement travel for moving the plate-like workpiece toward the gripper. This is the case in particular for the first readjustment operation since, when gripping the plate-like workpiece for the first time, that end edge of the plate-like workpiece which engages in the clamping jaw bears against the zero stop of the clamping jaw of the gripper, in order to have a defined orientation. In the case of further subsequent readjustment processes, the movement travel for the moving-toward and moving-away operations is preferably identical.

Furthermore, preferably, after the readjustment travel has been passed through, the plate-like workpiece is held in a clamped manner by the grippers and the upper pressure-exerting device is transferred to the rest position and the subsequent processing cycle is started.

Advantageously, during the readjustment process, it is possible for the process parameters for the movement speed of the feed device and/or of the stroke drive device to be reduced. This enables increased process safety, since the moments of inertia are reduced in the case of lowered movement speeds and/or accelerations.

Collision monitoring may be carried out prior to and/or during the readjustment process. In particular, such collision monitoring is carried out by a process controller. What is achieved as a result is that the pressure plungers of the upper pressure-exerting device and/or the counter-bearings of the lower supporting device are positioned adjacent to processed regions of the plate-like workpiece. Such processed regions in the plate-like workpiece may be cutaway portions, elevations or depressions or gills or fluting or the like.

A further advantageous configuration of the method provides that, during the readjustment process, a clamping of the plate-like workpiece by an upper tool and a lower tool is controlled in parallel and/or successively with respect to the readjustment device. As a result of this additional clamping of the plate-like workpiece between the upper tool and lower tool or a scraper on the upper tool and a lower tool, additional fixing can be effected. In particular, the pressure plungers and the scraper or the upper tool are arranged in a triangular position relative to one another. As a result, the plate-like workpiece can be held in a clamped manner at three points, and an increased holding moment against the rotation of the plate-like workpiece in the XY plane can be obtained.

Other features which are considered as characteristic for the invention are set forth in the appended claims.

Although the invention is illustrated and described herein as embodied in a readjustment device and a readjustment method for a plate-like workpiece in a processing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
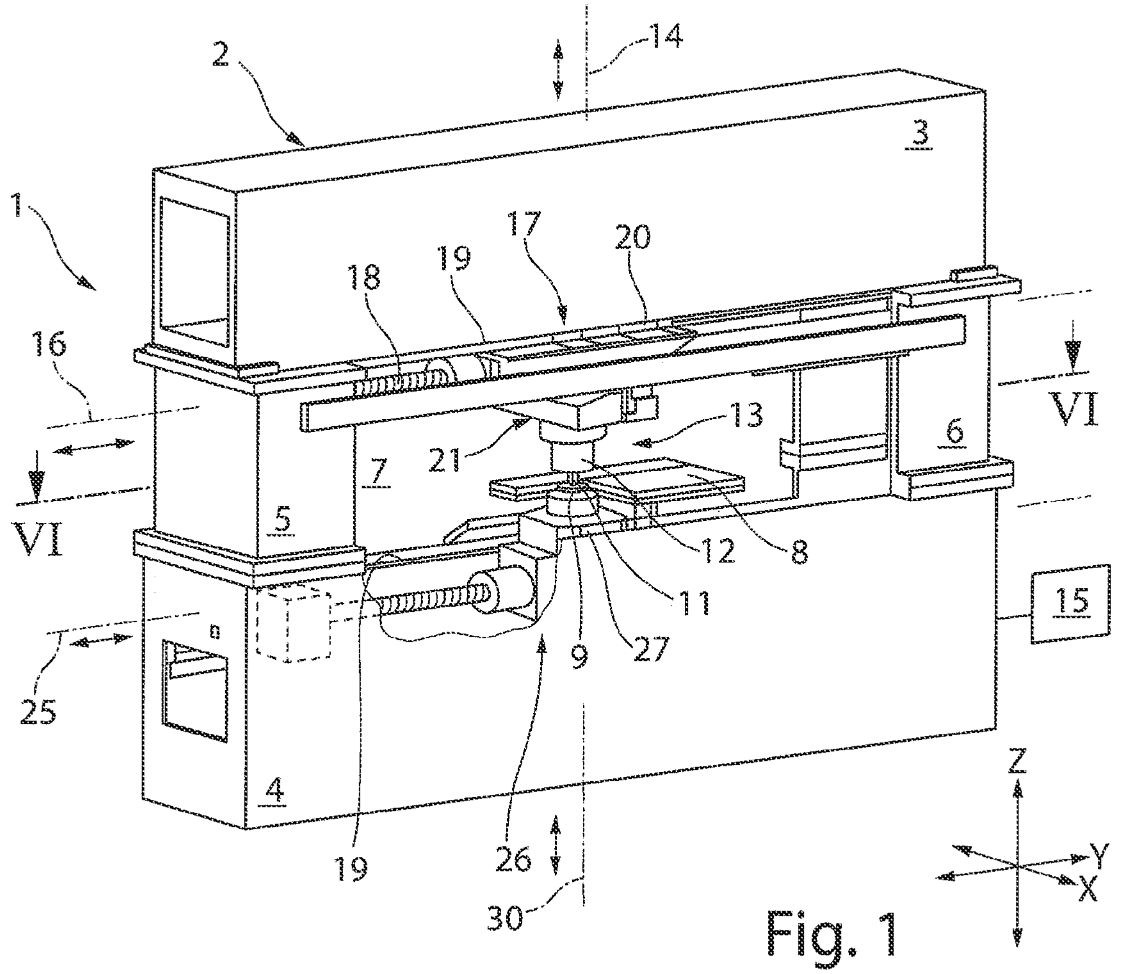
FIG. 1 is a diagrammatic, perspective view of a machine tool.

Referring now to the figures of the drawings in detail and first, particularly to FIG. 1 thereof, there is shown a machine tool 1 which is in the form of a punch press. The machine tool 1 contains a load-bearing structure with a closed machine frame 2. The machine frame 2 has two horizontal frame members 3, 4 and two vertical frame members 5 and 6. The machine frame 2 encloses a frame interior space 7, which forms the working region of the machine tool 1 with an upper tool 11 and a lower tool 9.

The machine tool 1 serves for the processing of plate-like workpieces 10, which for the sake of simplicity are not illustrated in FIG. 1, and which for processing purposes can be arranged in the frame interior space 7. The workpiece 10 for processing is placed onto a workpiece support 8 which is provided in the frame interior space 7. The lower tool 9, for example in the form of a punching die, is mounted, in a cutout of the workpiece support 8, on the lower horizontal frame member 4 of the machine frame 2. The punching die may be provided with a die opening. In the case of a punching processing operation, the upper tool 11 in the form of a punch dips into the die opening of the lower tool in the form of a punching die.

Instead of a punch and a punching die, the upper tool 11 and lower tool 9 may also be used as a bending ram and a bending die for shaping workpieces 10.

The upper tool 11 is fixed in a tool receptacle at a lower end of a plunger 12. The plunger 12 is part of a stroke drive apparatus 13, by means of which the upper tool 11 can be moved in a stroke direction along a stroke axis 14. The stroke axis 14 runs in the direction of the Z axis of the coordinate system of a numerical controller 15, indicated in FIG. 1, of the machine tool 1. Perpendicularly with respect to the stroke axis 14, the stroke drive apparatus 13 can be moved along a positioning axis 16 in the direction of the double arrow. The positioning axis 16 runs in the direction of the Y direction of the coordinate system of the numerical controller 15. The stroke drive apparatus 13, which receives the upper tool 11, is moved along the positioning axis 16 by means of a motor drive 17.

The movement of the plunger 12 along the stroke axis 14 and the positioning of the stroke drive apparatus 13 along the positioning axis 16 are effected by means of a motor drive 17 in the form of a drive arrangement 17, in particular a spindle drive arrangement, with a drive spindle 18 which runs in the direction of the positioning axis 16 and which is fixedly connected to the machine frame 2. During movements along the positioning axis 16, the stroke drive apparatus 13 is guided on two three guide rails 19 of the upper frame member 3, of which guide rails 19 can be seen in FIG. 1. The one remaining guide rail 19 runs parallel to the visible guide rail 19 and is spaced apart from the latter in the direction of the X axis of the coordinate system of the numerical controller 15. Guide shoes 20 of the stroke drive apparatus 13 run on the guide rails 19. The mutual engagement of the guide rail 19 and of the guide shoes 20 is such that this connection between the guide rails 19 and the guide shoes 20 can also accommodate a load acting in a vertical direction. The stroke apparatus 13 is accordingly suspended on the machine frame 2 by means of the guide shoes 20 and the guide rails 19. A further part of the stroke drive apparatus 13 is a wedge mechanism 21 by means of which a position of the upper tool 11 relative to the lower tool 9 is settable.

The lower tool 9 is received so as to be movable along a lower positioning axis 25. This lower positioning axis 25 runs in the direction of the Y axis of the coordinate system of the numerical controller 15. The lower positioning axis 25 is preferably oriented parallel to the upper positioning axis 16. The lower tool 9 can, directly at the lower positioning axis 16, be moved along the positioning axis 25 by means of a motor drive arrangement 26. As an alternative or in addition, the lower tool 9 may also be provided on a stroke drive apparatus 27, which can be moved along the lower positioning axis 25 by means of the motor drive arrangement 26. This drive arrangement 26 is preferably in the form of a spindle drive arrangement. The lower stroke drive apparatus 27 may correspond in terms of design to the upper stroke drive apparatus 13. The motor drive arrangement 26 may likewise correspond to the motor drive arrangement 17.

The lower stroke drive apparatus 27 is likewise mounted displaceably on guide rails 19 which are assigned to a lower horizontal frame member 4. Guide shoes 20 of the stroke drive apparatus 27 run on the guide rails 19 such that the connection between the guide rails 19 and guide shoes 20 on the lower tool 9 can also accommodate a load acting in a vertical direction. Accordingly, the stroke drive apparatus 27 is also suspended on the machine frame 2 by means of the guide shoes 20 and the guide rails 19 and so as to be spaced apart from the guide rails 19 and guide shoes 20 of the upper stroke drive apparatus 13. The stroke drive apparatus 27 may also comprise a wedge mechanism 21 by means of which the position or height of the lower tool 9 along the Z axis is settable.

By way of the numerical controller 15, it is possible for both the motor drives 17 for a movement of the upper tool 11 along the upper positioning axis 16 and the motor drive or drives 26 for a movement of the lower tool 9 along the lower positioning axis 25 to be controlled independently of one another. The upper tool and lower tool 11, 9 can thus be moved synchronously in the direction of the Y axis of the coordinate system. Equally, it is possible for an independent movement of the upper tool and lower tool 11, 9 to also be controlled in different directions. This independent movement of the upper tool and lower tool 11, 9 may be controlled simultaneously. The decoupling of the movement between the upper tool 11 and the lower tool 9 makes it possible to obtain increased flexibility in the processing of workpieces 10. The upper tool and lower tool can also be configured in a variety of ways for processing of the workpieces 10.

Figure 2:
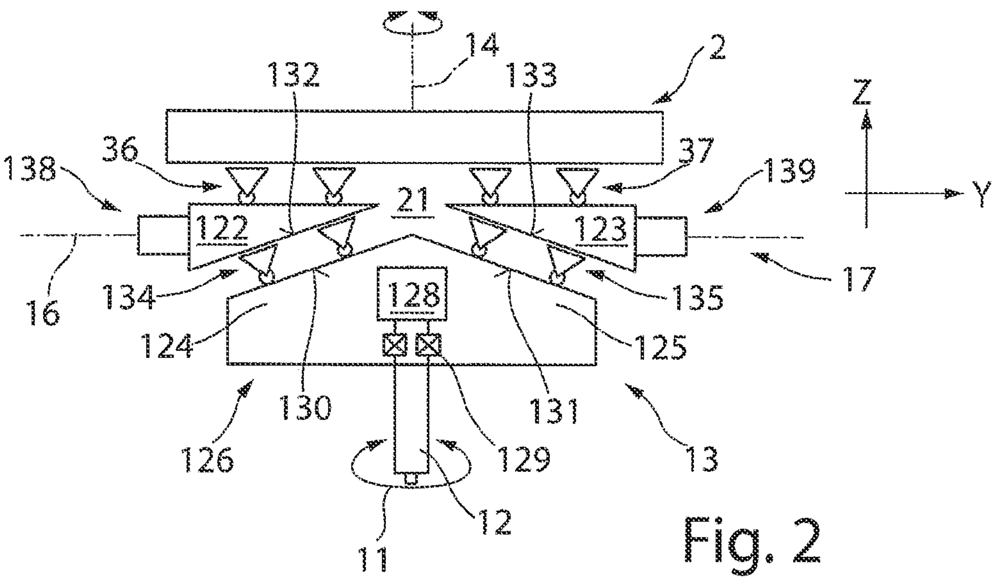
FIG. 2 is a schematic illustration of a fundamental design of a stroke drive apparatus and of a motor drive according to FIG. 1.

One part of the stroke drive apparatus 13 is the wedge mechanism 21, which is illustrated in FIG. 2. The wedge mechanism 21 contains two drive-side wedge mechanism elements 122, 123, and also two output-side wedge mechanism elements 124, 125. The latter are structurally combined to form a structural unit in the form of an output-side double wedge 126. The plunger 12 is mounted on the output-side double wedge 126 so as to be rotatable about the stroke axis 14. A motor rotary drive apparatus 128 is accommodated in the output-side double wedge 126 and advances the plunger 12 about the stroke axis 14 as required. In this case, a rotation of the plunger 12 both to the left and to the right is possible according to the double arrow in FIG. 2. A plunger mount 129 is schematically illustrated. Firstly, the plunger mount 129 permits low-friction rotational movements of the plunger 12 about the stroke axis 14, and, secondly, the plunger mount 129 supports the plunger 12 in an axial direction and correspondingly carries away loads, which act on the plunger 12 in the direction of the stroke axis 14, into the output-side double wedge 126.

The output-side double wedge 126 is delimited by a wedge surface 130, and by a wedge surface 131 of the output-side mechanism element 125. Wedge surfaces 132, 133 of the drive-side wedge mechanism elements 122, 123 lie opposite to the wedge surfaces 130, 131 of the output-side wedge mechanism elements 124, 125. By way of longitudinal guides 134, 135, the drive-side wedge mechanism element 122 and the output-side wedge mechanism element 124, and the drive-side wedge mechanism element 123 and the output-side wedge mechanism element 125, are guided so as to be movable relative to one another in the direction of the Y axis, that is to say in the direction of the positioning axis 16 of the stroke drive apparatus 13.

The drive-side wedge mechanism element 122 has a motor drive unit 138, and the drive-side wedge mechanism element 123 has a motor drive unit 139. Both drive units 138, 139 together form the spindle drive arrangement 17.

Common to the motor drive units 138, 139 is the drive spindle 18, which is shown in FIG. 1, in the form of a drive apparatus which is mounted on the machine frame 2 and which is consequently on the load-bearing-structure side.

With respect to the motor drive units 138, 139, the drive-side wedge mechanism elements 122, 123 are operated in such a way that they move for example toward one another along the positioning axis 16, as a result of which a relative movement between, for one part, the drive-side wedge mechanism elements 122, 123 and, for the other part, the output-side wedge mechanism elements 124, 125 is produced. As a result of this relative movement, the output-side double wedge 126, and the plunger 12 mounted thereon, is moved downward along the stroke axis 14. The punch 11, which is for example mounted on the plunger 12, executes a working stroke and in so doing processes a workpiece 10 mounted on the workpiece rest 28, 29 or on the workpiece support 8. As a result of a movement of the drive wedge elements 122, 123 in the opposite direction, the plunger 12 is in turn raised or moved upward along the stroke axis 14.

The above-described stroke drive apparatus 13 according to FIG. 2 is preferably of identical design to the lower stroke drive apparatus 27 and accommodates the lower tool 9.

Figure 3:
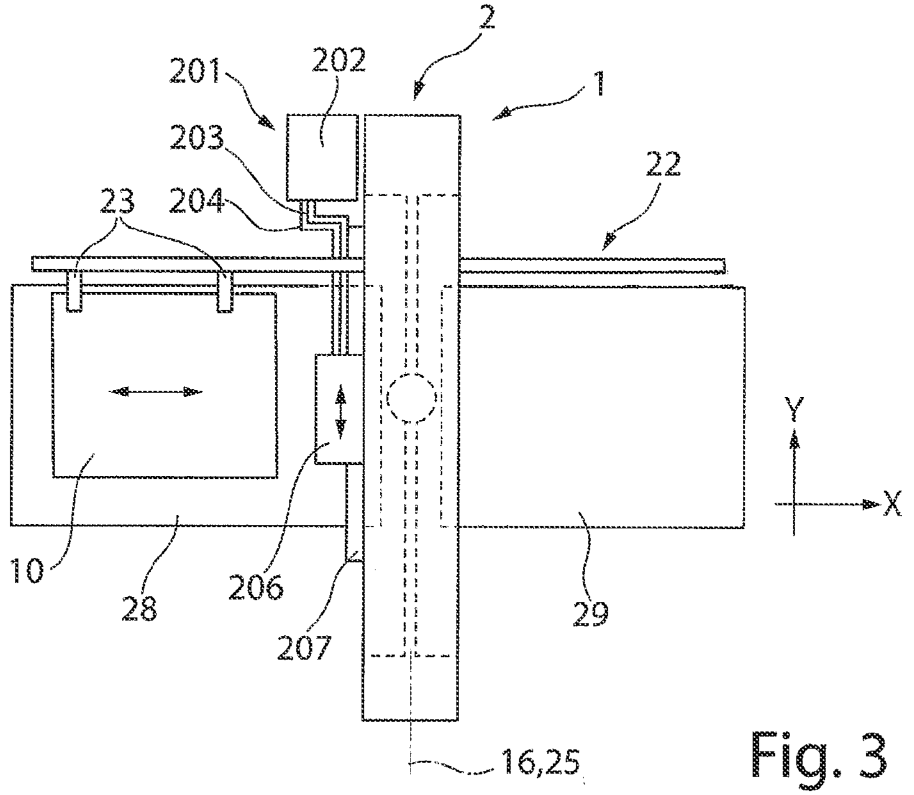
FIG. 3 is a schematic top view of the machine tool according to FIG. 1 with workpiece rests.

FIG. 3 illustrates a schematic view of the machine tool 1 according to FIG. 1. A respective workpiece rest 28, 29 extends laterally on the machine frame 2 of the machine tool 1. The workpiece rest 28 may be assigned, for example, to a loading station (not illustrated in any more detail) by means of which unprocessed workpieces 10 are placed onto the workpiece rest surface 28. Provided adjoining the workpiece rest surface 28, 29 is a feed device 22 which comprises a plurality of grippers 23 in order to grip the workpiece 10 placed onto the workpiece rest 28. The workpiece 10 is guided in the X direction through the machine frame 2 by means of the feed device 22. Preferably, the feed device 22 may also be controlled so as to be able to move in the Y direction. As a result, a free movement of the workpiece 10 in the X-Y plane can be provided. Depending on the work task, the workpiece 10 may be movable by the feed device 22 both in the X direction and counter to the X direction. This movement of the workpiece 10 may be adapted to a movement of the upper tool 11 and lower tool 9 in and counter to the Y direction for the respective processing task.

The further workpiece rest 29 is provided on the machine frame 2 so as to lie opposite to the workpiece rest 28. This may be assigned, for example, to an unloading station. As an alternative, loading and unloading of the unprocessed workpiece 10 and processed workpiece 10 with workpieces 81 may also be assigned to the same workpiece rest 28, 29.

The machine tool 1 may furthermore contain a laser processing apparatus 201, in particular a laser cutting machine, which is illustrated only schematically in a top view in FIG. 3. The laser processing apparatus 201 may, for example, be in the form of a $CO_2$ laser cutting machine. The laser processing apparatus 201 comprises a laser source 202, which generates a laser beam 203 which is guided to a laser processing head, in particular a laser cutting head 206, by means of a schematically illustrated beam guide 204 and focused therein. Then, the laser beam 204 is oriented perpendicularly with respect to the surface of the workpiece 10 by a cutting nozzle, in order to process the workpiece 10. The laser beam 203 acts, preferably together with a process gas beam, on the workpiece 10 at the processing location, in particular cutting location. The cutting point, at which the laser beam 203 is incident on the workpiece 10, is adjacent to the processing point of the upper tool 11 and lower tool 9.

The laser cutting head 206 can be moved by means of a linear drive 207 with a linear axis system at least in the Y direction, preferably in the Y and Z direction. This linear axis system, which accommodates the laser cutting head 206, may be assigned to, fastened to or integrated into the machine frame 2. A beam passage opening 210 in the workpiece rest 28 is provided below a working space of the laser cutting head 206. Preferably, a beam collection apparatus for the laser beam 21 may be provided below the beam passage opening 210. The beam passage opening 210 and possibly the beam collection apparatus may also be in the form of a structural unit.

As an alternative, the laser processing apparatus 201 may also have a solid-state laser as laser source 202, the radiation of which is guided to the laser cutting head 206 with the aid of a fiber-optic cable.

Figure 4:
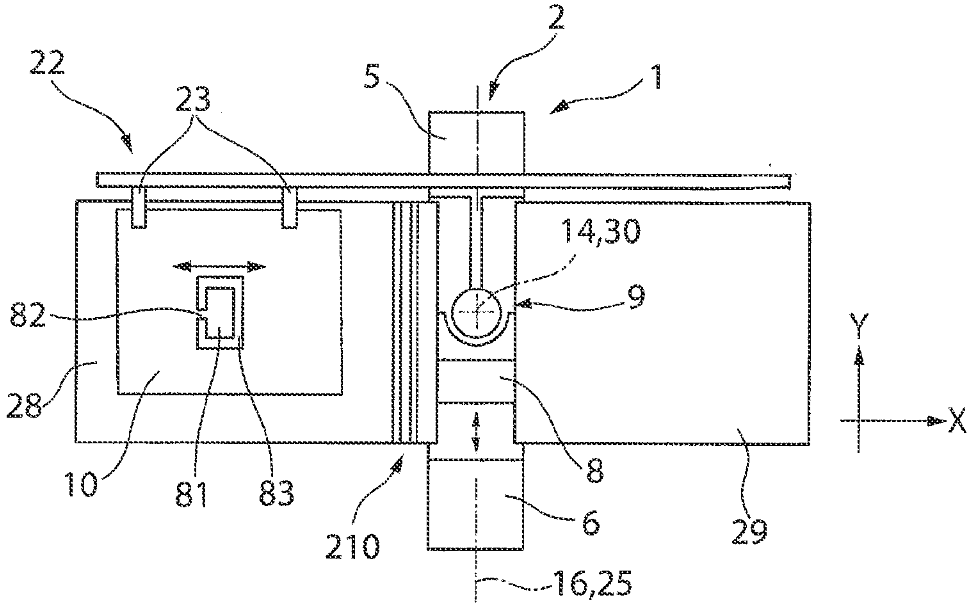
FIG. 4 is a sectional view of the machine tool along line shown IV-IV in FIG. 1 with a workpiece rest surface assigned to the machine base frame.

FIG. 4 shows a schematic sectional view according to line VI-VI shown in FIG. 1. In this view of the machine tool 1, the vertical frame members 5 and 6 and the upper horizontal frame member 3 have been omitted. This view shows that the workpiece rest 28, 29 extends directly onto a workpiece support 8, which at least partially surrounds the lower tool 9. Within a free space produced therebetween, the lower tool 9 can be moved in and counter to the Y direction along the lower positioning axis 25. Furthermore, the beam passage opening 210 in the workpiece rest 28 is illustrated, provided that this machine tool 1 is equipped with a laser processing apparatus 21.

Resting on the workpiece rest 28 by way of example is a processed workpiece 10 in which a workpiece part 81 has been cut free by a cutting gap 83, for example by means of a punching processing operation or by means of a laser beam processing operation, with the exception of a residual connection 82. Due to this residual connection, the workpiece part 81 is held in the workpiece 10 or in the remaining scrap skeleton. In order to separate the workpiece part 81 from the workpiece 10, the workpiece 10 is positioned with respect to the upper tool and lower tool 11, 9 by means of the feed device 22 for a spacing and discharge step. In this case, the residual connection 82 is separated by a punching stroke of the upper tool 11 with respect to the lower tool 9. The workpiece part 81 may be discharged downward for example by partial lowering of the workpiece support 8. As an alternative, in the case of larger workpiece parts 81, the cut-free workpiece part 81 may be transferred again back to the workpiece rest 28 or to the workpiece rest 29 in order to unload the workpiece part 81 and the scrap skeleton. Small workpiece parts 81 may possibly also be discharged through an opening in the lower tool 9.

Figure 5:
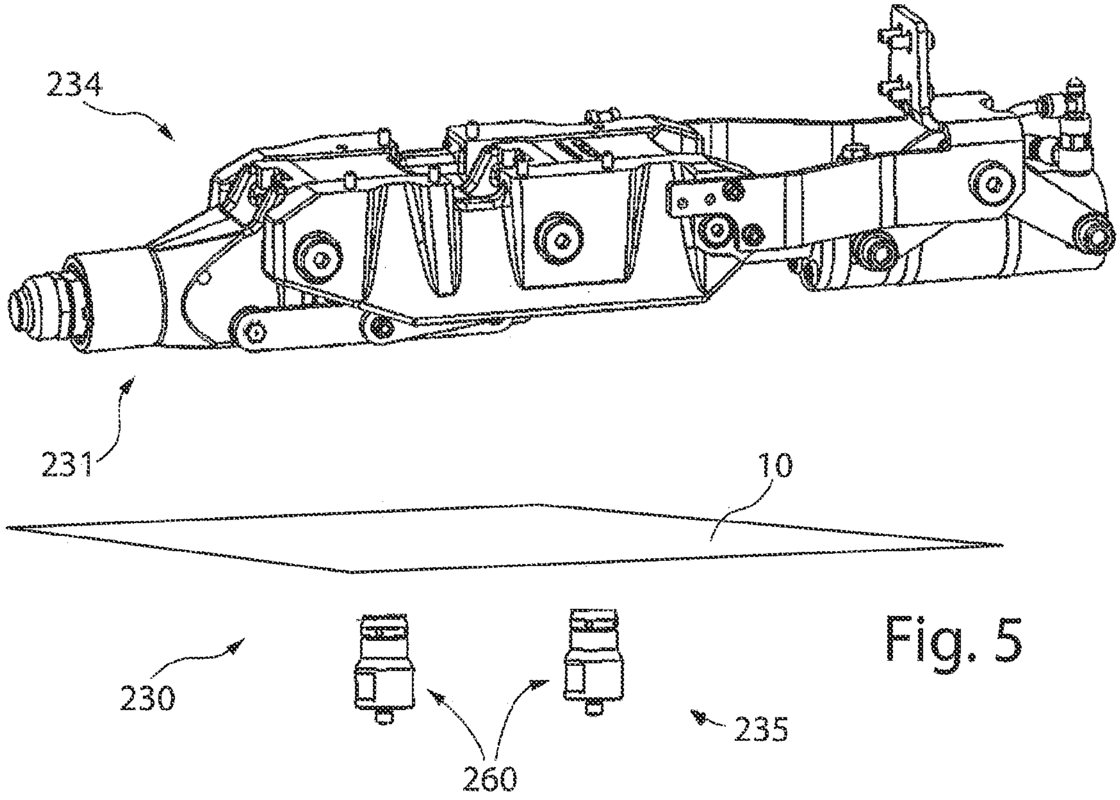
FIG. 5 is a perspective view of a readjustment device in a rest position.
Figure 6:
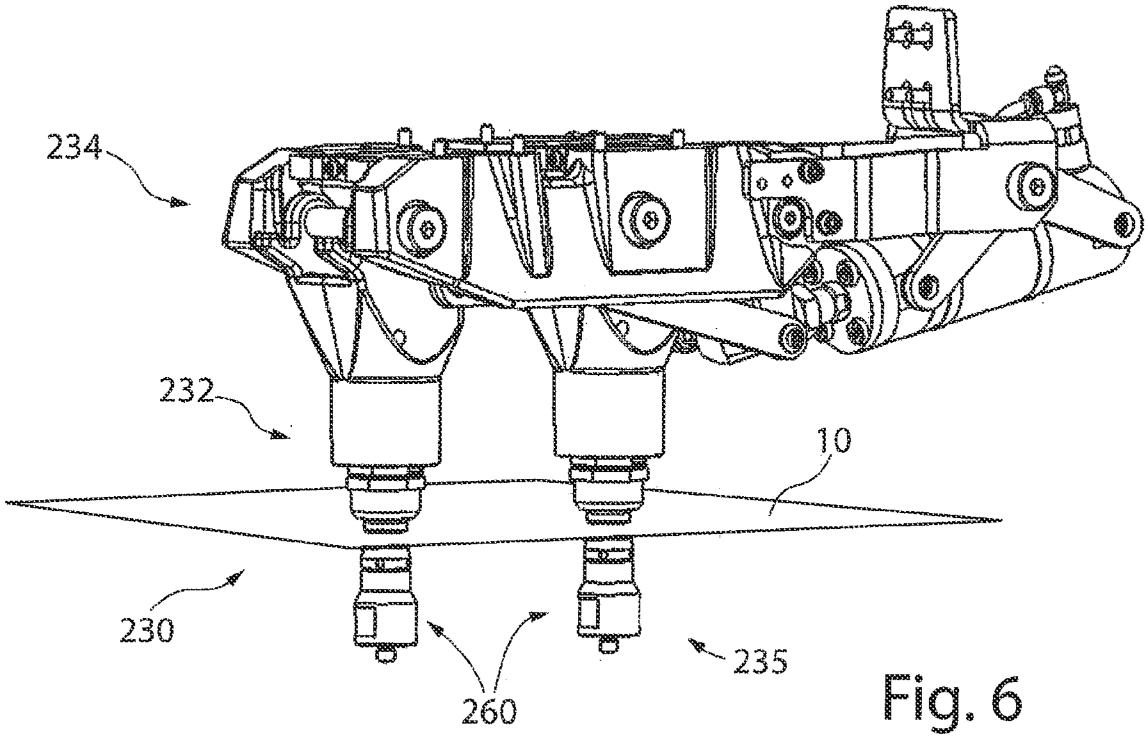
FIG. 6 is a perspective view of the readjustment device according to FIG. 5 in a working position.

FIG. 5 illustrates a readjustment device 230 in a rest position 231. FIG. 6 illustrates the readjustment device 230 according to FIG. 5 in a working position 232. The readjustment device 230 contains an upper pressure-exerting device 234 and a lower supporting device 235. The upper pressure-exerting device 234 is provided on the upper stroke drive device 13. The lower supporting device 235 is provided on the lower stroke drive device 27. The pressure-exerting device 234 and the supporting device 235 are preferably oriented adjacent to the upper tool 11 and lower tool 9, respectively.

Figure 7:
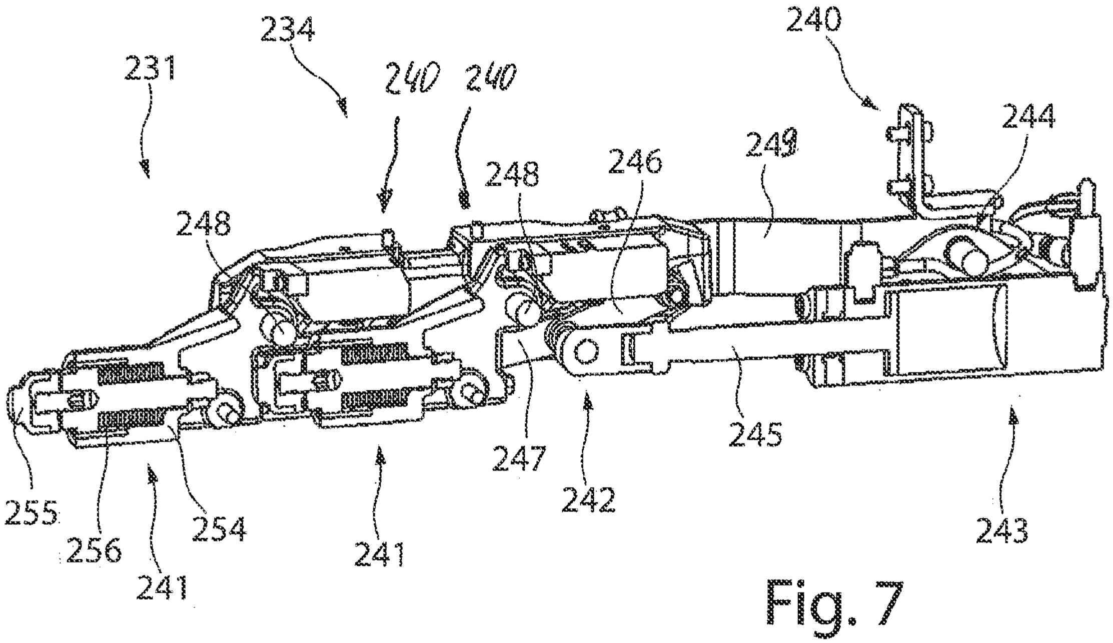
FIG. 7 is a perspective view of an upper pressure-exerting device of the readjustment device in the rest position.
Figure 8:
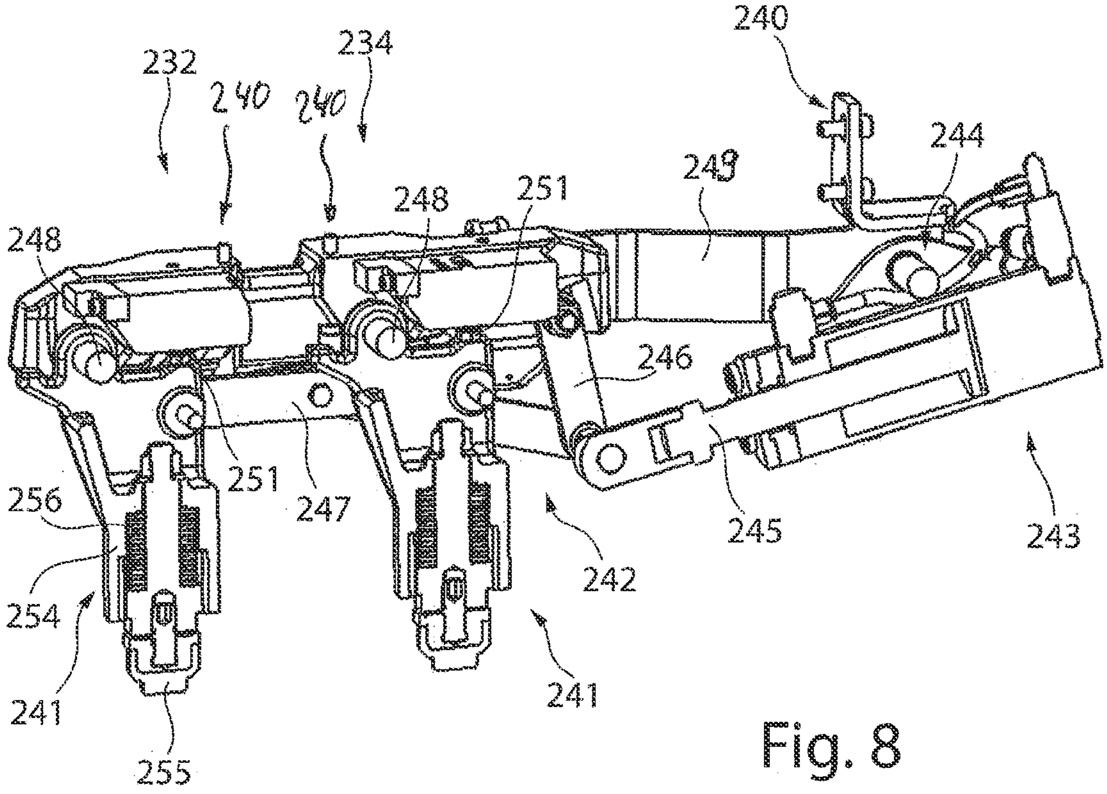
FIG. 8 is a perspective view of the pressure-exerting device according to FIG. 7 in a working position.

FIGS. 7 and 8 show sectional views of the upper pressure-exerting device 234 in the rest position 231 and the working position 232. The upper pressure-exerting device comprises a mounting interface 240 for releasable arrangement on the stroke drive device 13. Provided lying opposite to the mounting interface are by way of example two pressure plungers 241 which can be transferred from the rest position 231 to a working position 232 by means of a joint mechanism 242. In the working position 232, the pressure plungers 241 face the plate-like material 10. In particular, they are oriented perpendicularly with respect to the plane of the plate-like workpiece 10 in the working position 232. In order to control a movement of the pressure plungers 241, a drive device 243 is provided. This drive device 243 is preferably arranged so as to be able to rotate about a bearing 244. As a result, the drive device 243 can carry out corresponding pivoting movements during the actuation of the joint mechanism 242. In the rest position 232 of the pressure-exerting device 234, the pressure plungers 241 are preferably arranged in a row one behind the other. In particular, the drive device 243 is provided in the same plane in the rest position. The drive device 243 is, for example, in the form of a reciprocating piston. The joint mechanism 242 is actuated by means of a piston rod 245. The joint mechanism 242 may be formed from a plurality of lever arms 246, 247, in order to control the pivoting movement of the pressure plungers 241 about positionally fixed axles 248. These positionally fixed axles 248 are provided on a main body or holding element 249, which is fixedly connected to the interface 240 and which preferably also accommodates an axis of rotation for the bearing 244.

In order to transfer the pressure plungers 241 from the rest position 231 to the working position 232, the drive device 243 is actuated. By way of example, the piston rod 245 retracts into the piston. The lever arms 246, 247 are controlled such that the pressure plungers 241 carry out a pivoting movement through 90°. An end position of the pressure plungers 241 in the working position 232 is assumed by way of stops 251 which are preferably settable.

The joint mechanism 242 may be configured in the manner of a toggle lever principle or may encompass such a toggle lever principle, with the result that, during a pivoting movement of the pressure plungers 241 from the working position 232 to the rest position 231, an increased force can be applied in order to transfer the pressure plungers 241 to the horizontal position.

The pressure plungers 241 consist of a cylindrical housing 254 in which pressure pins 255 are resiliently mounted. A disk spring assembly 256 is preferably provided between the housing 254 and the pressure pin 255, such that, for the one part, a degree of flexibility can be applied and, for the other part, a sufficient contact pressure on the plate-like workpiece 10 can be applied by the pressure plungers 241.

The lower supporting device 235 contains, for example, two counter-bearings 260. The number of counter-bearings 260 is adapted to the number of pressure plungers 241. The counter-bearings 260 are oriented with respect to the longitudinal axis of the pressure plungers 241 in the working position 232.

According to a first embodiment, the counter-bearings 260 are provided fixedly on a base frame which can, in turn, be fastened to the lower stroke drive device 27. As an alternative, the counter-bearings 260 may also be of height-adjustable and/or flexible form.

Figure 9:
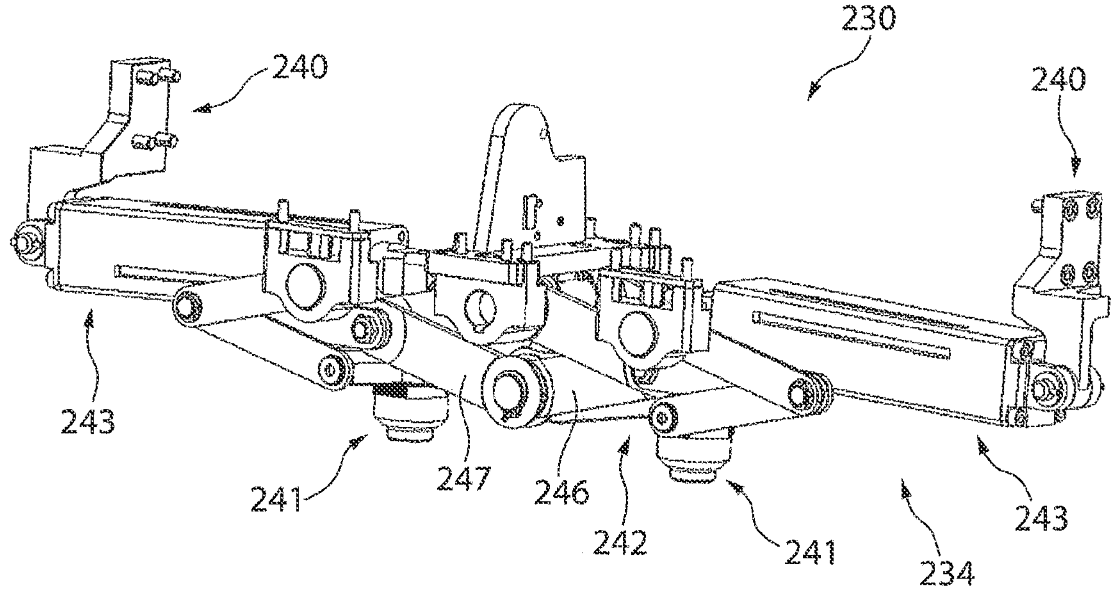
FIG. 9 is a perspective view of an alternative embodiment of the upper pressure-exerting device in relation to FIG. 5 in a rest position.
Figure 10:
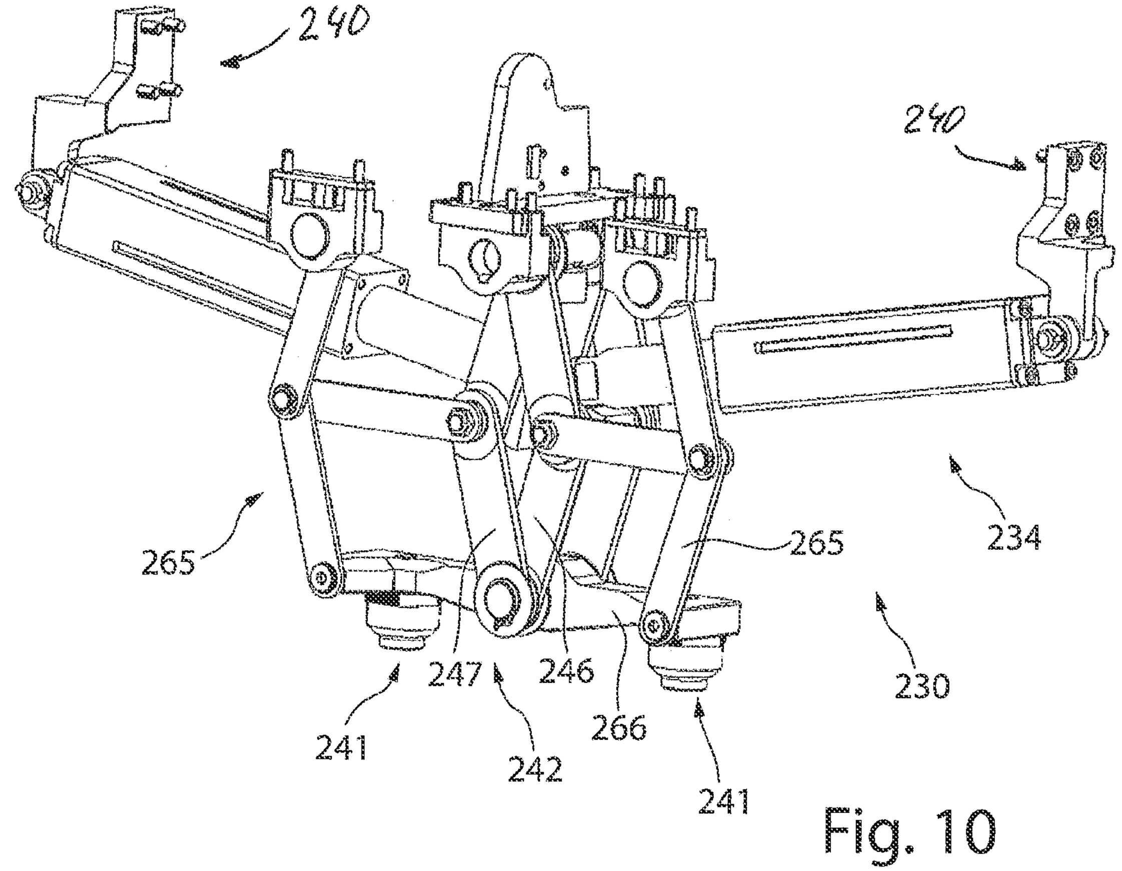
FIG. 10 is a perspective view of the pressure-exerting device according to FIG. 9 in a working position.

FIG. 9 illustrates a perspective view of an alternative embodiment of the upper pressure-exerting device 234 in the rest position 231. FIG. 10 shows the alternative embodiment of the pressure-exerting device 234 according to FIG. 9 in the working position 232.

This embodiment comprises an alternative configuration of the joint mechanism 242. In this embodiment, the joint mechanism 242 is in the form of a scissors-type arrangement. The lever arms 246, 247 can be transferred from a flatly folded-together arrangement according to FIG. 9 to an extended arrangement according to FIG. 10. A type of parallelogram linkage 265 may be provided parallel to the lever arms 246, 247, as a result of which it is possible for the, for example, two pressure plungers 241, which are arranged on a receiving element 266, to remain oriented in a horizontal manner during the retracting and extending movement of the joint mechanism 242.

In this embodiment according to FIGS. 9 and 10, the pressure plungers 241 according to the embodiment in FIGS. 7 and 8 may be used. As an alternative, it is also possible for only pressure pins 255 to be provided, which are height-adjustable but provided fixedly on the receiving element 266.

In this embodiment, in order to control the movement between the rest position 231 and the working position 232, for example two mutually opposite drive devices 243 are provided which act on the scissors-type arrangement from each side in order to actuate said scissors-type arrangement.

In this alternative embodiment of the pressure-exerting device 234 according to FIGS. 9 and 10, the supporting device 235 may correspond to the above-described embodiments in relation to FIGS. 5 to 8.

FIGS. 11 to 16 schematically show individual working steps of a readjustment process, which is carried out in the machine tool 1 by means of a readjustment device 230 according to one of the above-described embodiments.

Figure 11:
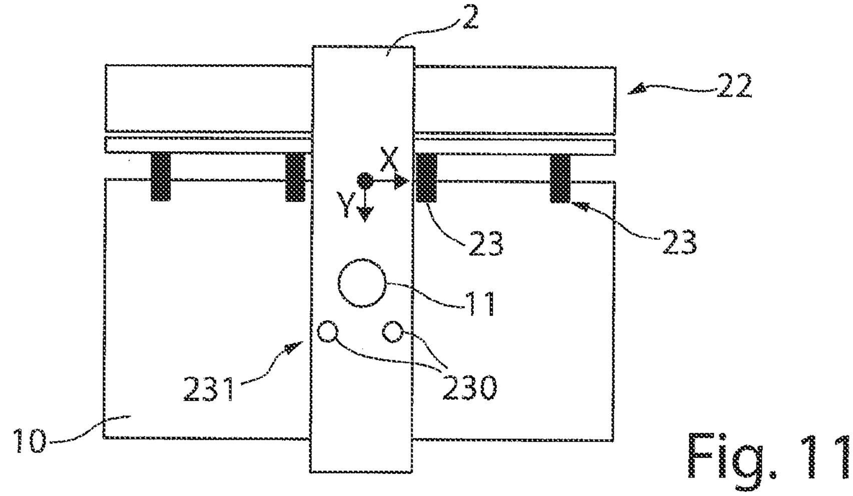
FIGS. 11 to 16 are schematic views for illustrating a readjustment process.

FIG. 11 schematically illustrates an initial position for a readjustment process. The initiation of a readjustment process is required if a movement travel of the feed device 22 in or counter to the X direction is smaller than a length of the plate-like workpiece 10 to be processed, the length extending in the X direction.

Figure 12:
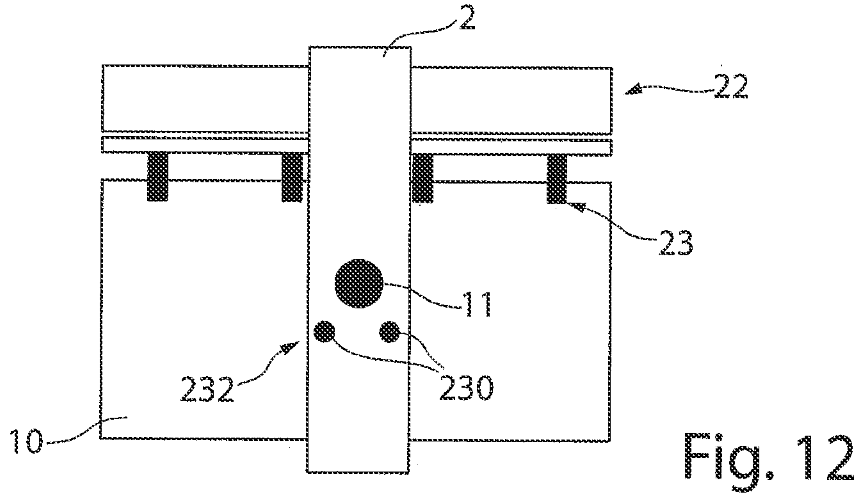
Figure 13:
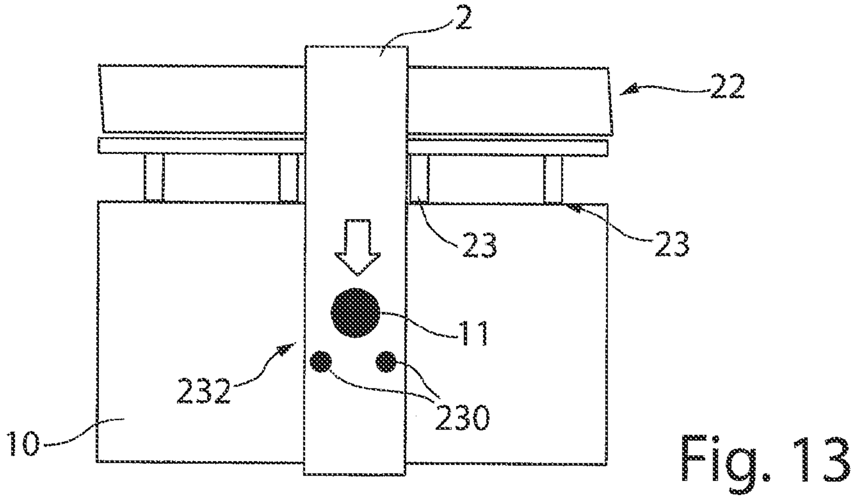

When the plate-like workpiece 10 is braced or clamped by the grippers 23 for the first time, an edge of the plate-like workpiece 10, the edge pointing into the gripper or facing the gripper 23, is positioned so as to bear against a zero stop of the gripper 23. The zero stop also serves for the orientation of the plate-like workpiece 10 when being gripped for the first time. After one or more processing steps by the upper tool and lower tool 11, 9 have been introduced into the plate-like workpiece 10, a readjustment process is started. The readjustment device 230, which is schematically illustrated, according to FIG. 11, in a rest position 231 according to FIG. 5, is controlled and transferred to a working position 232. This is schematically illustrated in FIG. 12. Specifically, the working position 232 of the readjustment device 230 is illustrated in FIG. 6.

As a result of the arrangement of the readjustment device 230 in the working position 232, the plate-like workpiece 10 is held fixed in position between the pressure plunger 241 and the opposite counter-bearing 260. The grippers 23 are still closed at this point in time. In addition, the upper tool 11 or a scraper assigned to the upper tool 11 and the lower tool 9 can be arranged in a clamping position with respect to the plate-like workpiece 10.

After secure clamping of the plate-like workpiece 10 has been effected at least by the readjustment device 230, the grippers 23 are opened. Subsequently, the grippers 23 are moved away by a movement between the feed device 22 and the workpiece rests 28, 29. Preferably, the workpiece rests 28, 29 are moved in the Y direction by the feed device 22. This is illustrated by way of example in FIG. 13. During this moving-away operation, that edge of the plate-like workpiece 10 which is assigned to the gripper 23 is preferably not guided completely out of the clamping jaws of the grippers 23, but rather still remains within the gap between the two clamping jaws.

Figure 14:
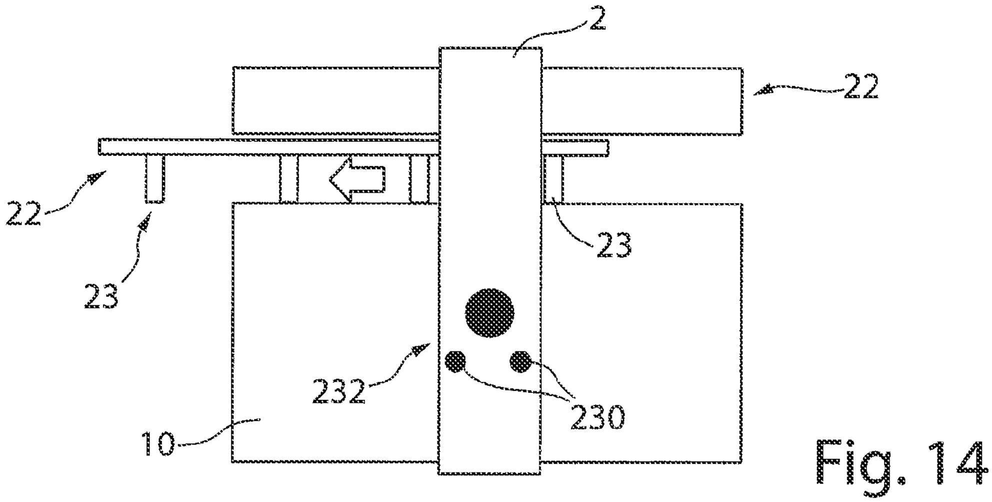

Subsequently, the movement of the feed device 22 in or counter to the X axis is for example controlled. This is illustrated in FIG. 14. After a predetermined readjustment travel of the feed device 22 has been taken, a moving-toward operation is effected, meaning that the edges of the plate-like workpiece 10 which face the grippers 23 are transferred back to a gripping position. In this case, when performing readjustment for the first time, the moving-toward travel is preferably smaller than the moving-away travel. The difference in travel is detected by the control device and taken into account during the further processing of the plate-like workpieces 10. The reduction in the moving-toward travel compared with the moving-away travel when performing readjustment for the first time has the advantage that straightness errors of the edge of the plate-like workpiece 10 which faces the grippers 23 can be compensated. During the further subsequent readjustment processes following the first readjustment, the moving-toward travel and moving-away travel is preferably identical.

Figure 15:
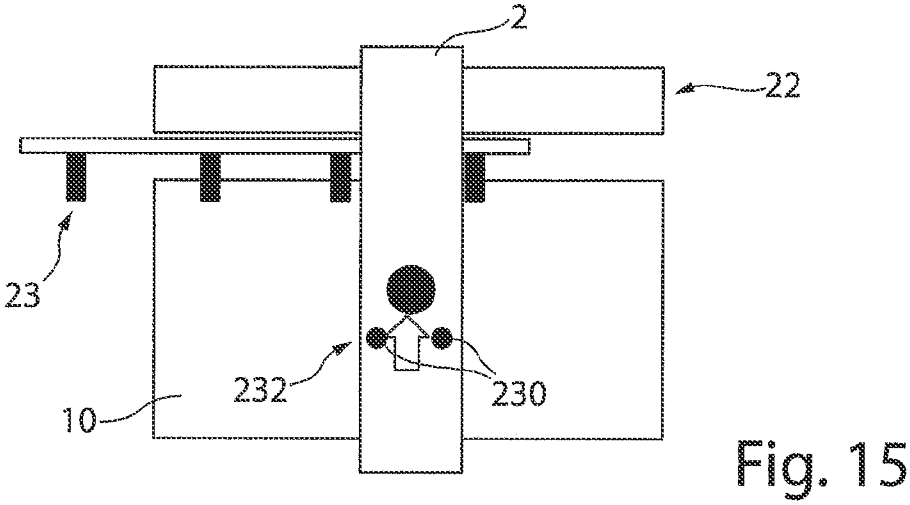

After the moving-toward operation, the grippers 23 of the feed device 22 are closed. This is illustrated in FIG. 15.

Figure 16:
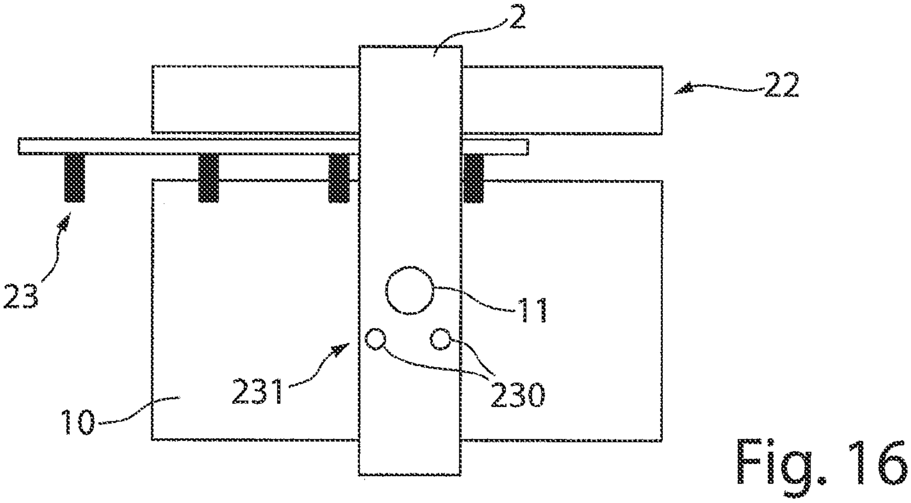

The readjustment device 230 is then transferred to the rest position 231 according to FIG. 5. If a clamping action by the scraper or the upper tool 11 and the lower tool 9 was additionally produced, this is also released. This is illustrated in FIG. 16. One or more processing cycles for the plate-like material 10 can then be started.

Figure 17:
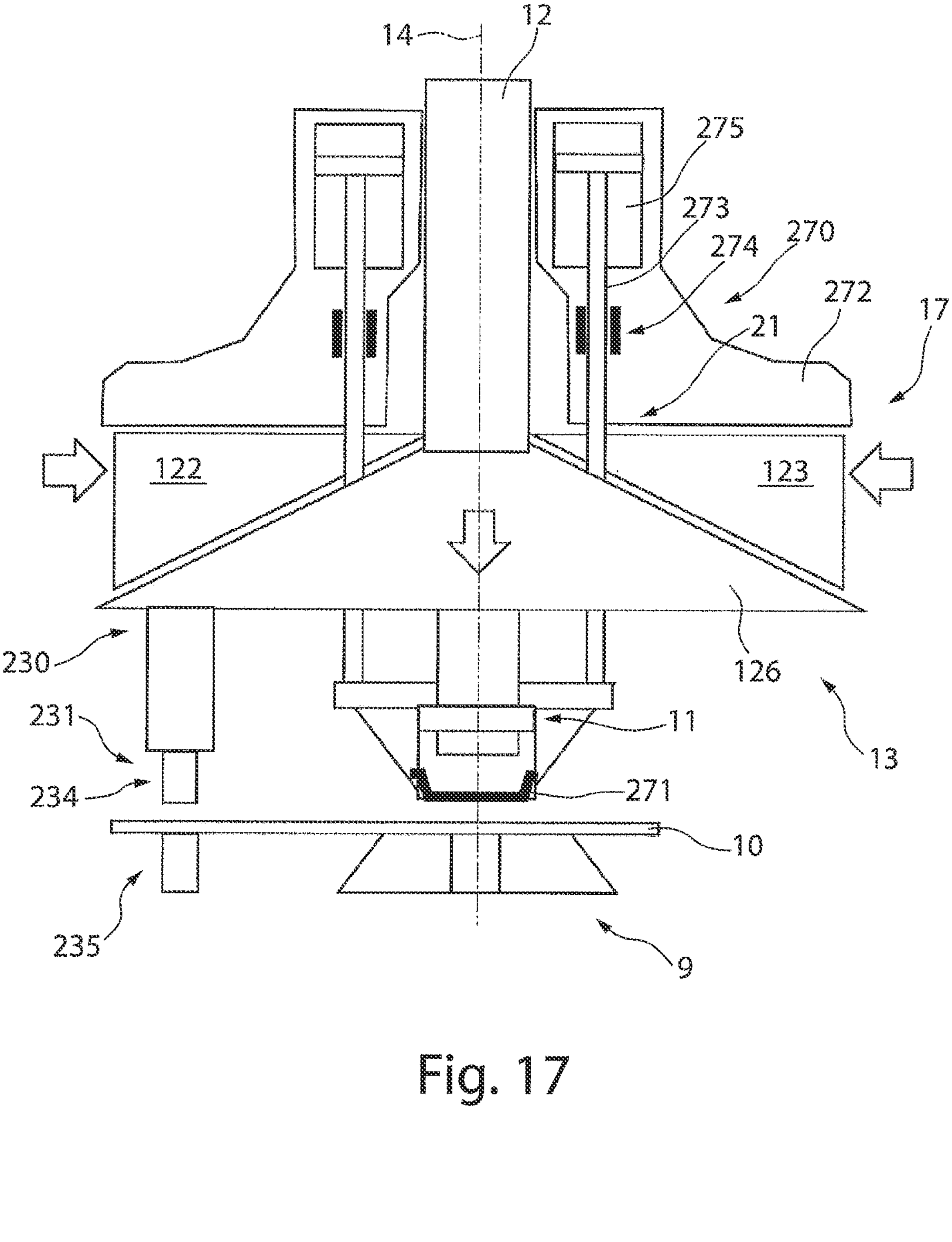
FIG. 17 is a schematic illustration of the upper drive apparatus with a readjustment device and an upper tool and a scraper in a rest position with respect to the plate-like workpiece.

FIG. 17 is a schematic illustration of the upper stroke drive apparatus 13 with the upper tool 11 arranged in a rest position with respect to the lower tool 9. The plate-like workpiece 10 rests on the lower tool 9. This stroke drive apparatus 13 has, in a supplementary manner in relation to the stroke drive apparatus 13 schematically illustrated in FIG. 2, a scraper device 270 and the readjustment device 230. Provided on the double wedge 126, in particular on the lower side thereof, is the upper pressure-exerting device 234 of the readjustment device 230. The lower supporting device 235 is positioned and oriented so as to lie opposite and adjacent to the lower tool 9. This readjustment device 230 is described in more detail in the preceding embodiments according to FIGS. 5 to 10.

The scraper device 270 comprises a scraper 271, which can be moved up and down or can be moved in terms of height relative to the upper tool 11 by means of a scraper drive 272. The scraper drive 272 contains a guide 273, in particular a column guide. The guide 273 consists, for example, of two or more guide rods which are oriented parallel to one another and which are guided in sleeves. Advantageously, at least one clamping sleeve 274 or a pair of clamping sleeves 274 is provided in the scraper drive 272, in order to fix a controlled vertical position of the scraper 271 along the stroke axis 14. In order to move the scraper 271 up and down, a drive cylinder 275, in particular a pneumatic cylinder, is provided. The movement of the scraper 271 is provided independently of the movement of the stroke drive apparatus 13 along the stroke axis 14 or of the plunger 12.

Figure 18:
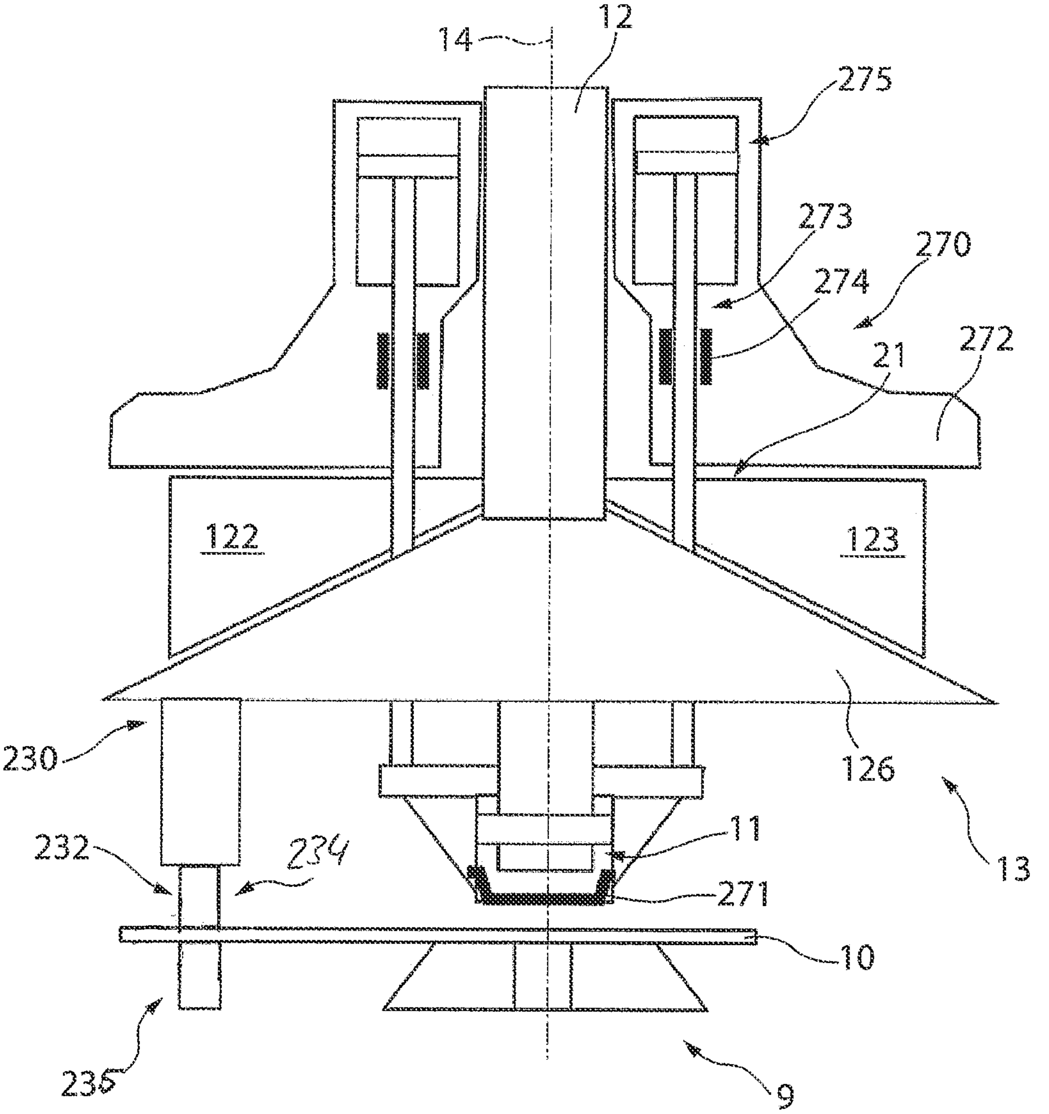
FIG. 18 is a schematic illustration of the upper stroke drive device with the readjustment device in a working position.

FIG. 17 illustrates the scraper 271 in a rest position, in which said scraper—like the upper tool 11—is arranged lifted off in relation to the plate-like workpiece 10 or the lower tool 9. Proceeding from such a position illustrated in FIG. 17, two methods, which differ from one another, for readjusting a plate-like workpiece for processing in a machine tool can electively be controlled. A first variant, in which only the readjustment device 230 is controlled in order to fix and readjust the plate-like workpiece 10, is illustrated by way of example in FIGS. 11 to 14. A working position 232 of the readjustment device 230 according to the above-described method in relation to FIGS. 11 to 16 is illustrated in FIG. 18. The scraper 271 and the upper tool 11 are still arranged in a rest position at a spacing to the plate-like workpiece 10 and lower tool 9. In a rest position or upper position of the stroke drive apparatus 13, the upper pressure-exerting device 234 is transferred from a rest position 231 to a working position 232. By way of the drive arrangement 17, by means of which the two drive-side wedge mechanisms 122, 123 are moved toward one another, the double wedge 136 is lowered, with the result that the upper pressure-exerting device 234 is transferred, in relation to the lower pressure-exerting device 235, to a clamping position in order to fix the plate-like workpiece 10.

The further working steps are effected as described in relation to FIGS. 11 to 16.

Figure 19:
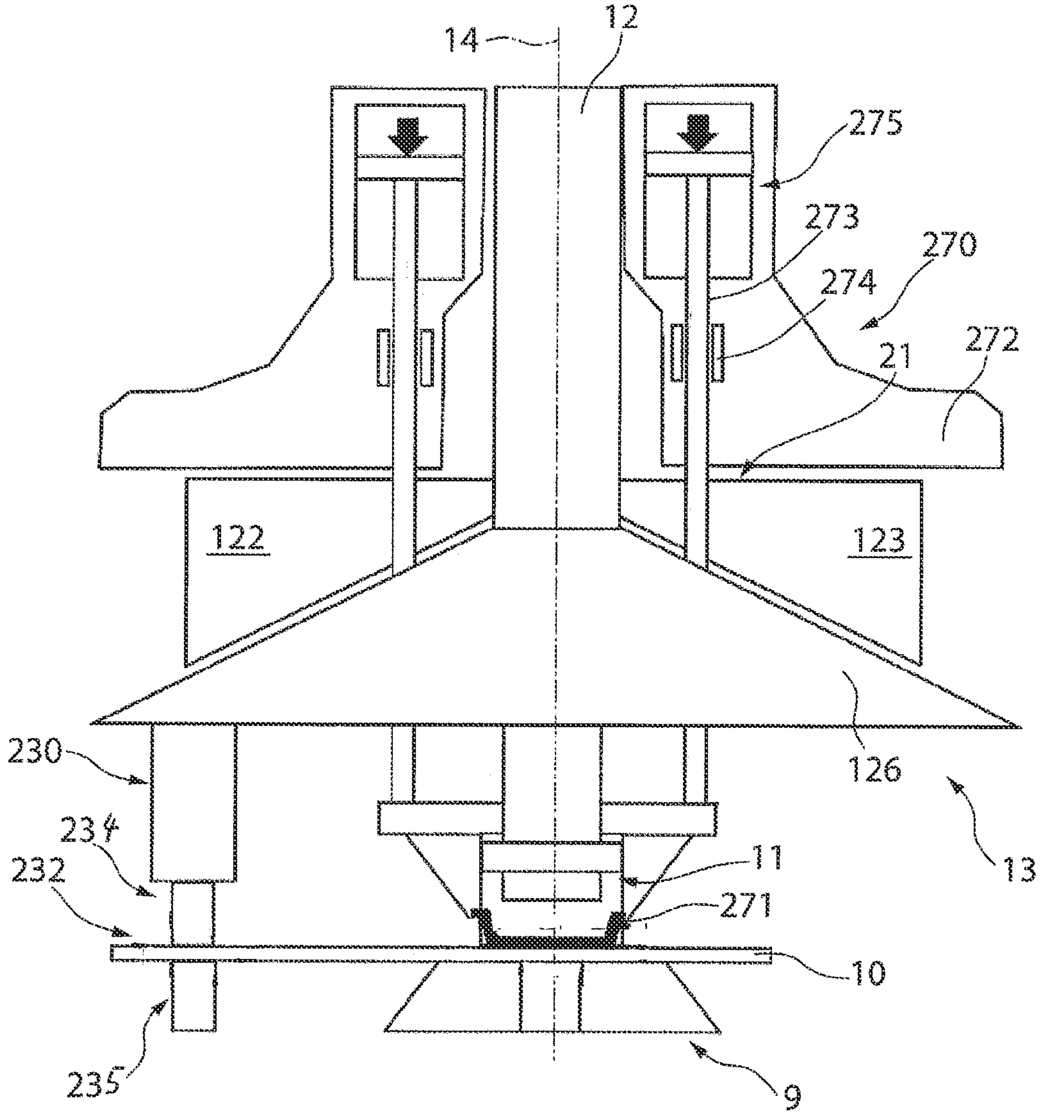
FIG. 19 is a schematic illustration of the upper stroke drive device according to FIG. 17 with the readjustment device and the scraper in a working position.

According to a further variant of the method for readjusting a plate-like workpiece 10, the plate-like workpiece 10 can be held in a clamped manner both by the readjustment device 230 and by the scraper 271 and/or the upper tool 11 with respect to the lower tool 9. The variant in which the readjustment device 230 and the scraper 271 are transferred to the clamping position is illustrated in FIG. 19. The scraper 271 and the upper pressure-exerting device 234 are fed, successively or simultaneously, to the plate-like workpiece 10, such that the plate-like workpiece 10 is held in a clamped manner both by the upper and lower pressure-exerting device 234, 235 and by the scraper 271 and the lower tool 9. In order to control a movement of the scraper 271 along the stroke axis 14, the clamping sleeves 274 are initially released, in order to then control the working cylinders 275, in particular to apply pressure thereto. In the clamping position, the clamping sleeves 274 can be transferred to a clamping position, such that the clamping position of the scraper 271 is maintained. The upper tool 11 may be transferred, in addition to or as an alternative to the scraper 271, to the clamping position with respect to the lower tool 9.

After the plate-like workpiece 10 has been readjusted, the upper stroke drive apparatus 13 is transferred to an initial position or upper stroke position along the stroke axis 14. The upper pressure-exerting device 234 is transferred or pivoted to a rest position 231. The clamping sleeves 274 for the scraper 271 are released. The scraper 271 can be transferred to a corresponding position for the subsequent processing operation. The further processing of the plate-like workpiece by means of the upper tool 11 and possibly with the assistance of the scraper 271 can then be controlled.

The invention claimed is:

1. A readjustment device for a machine tool for processing plate-shaped workpieces, the readjustment device comprising:

an upper pressure-exerting device having pressure plungers being oriented at a spacing to one another;

a lower supporting device having at least counter-bearings which are disposed at a spacing to one another and which, in a working position, are oriented so as to fix a plate-shaped workpiece in a clamping manner with respect to said pressure plungers of said upper pressure-exerting device; and at least one drive device, by means of said at least one drive device said pressure plungers of said upper pressure-exerting device are transferred from a rest position to the working position, wherein at least two of said pressure plungers of said upper pressure-exerting device are coupled to one another and are controlled so as to be movable or pivotable together between the rest position and the working position;

wherein said upper pressure-exerting device has a holding element on which two pivot axles, which are oriented in a parallel manner, for a pivotable configuration of said pressure plungers are provided at a spacing to one another; and wherein said pivot axles are disposed at a spacing to one another on said holding element of said upper pressure-exerting device, such that said pressure plungers lie in a line in the rest position.

2. The readjustment device according to claim 1, further comprising a joint or coupling mechanism, wherein said at least two pressure plungers of said upper pressure-exerting device are moved synchronously by said joint or coupling mechanism.

3. The readjustment device according to claim 2, wherein said at least one drive device has a piston rod; and said upper pressure-exerting device can be actuated by said piston rod of said at least one drive device, said piston rod engaging with said joint or coupling mechanism.

4. The readjustment device according to claim 2, wherein said joint or coupling mechanism has a sliding member or a lever arm; and further comprising at least one toggle lever mechanism being disposed between said sliding member or said lever arm of said joint or coupling mechanism, said sliding member or said lever arm engaging with said pressure plungers and said at least one drive device.

5. The readjustment device according to claim 2, wherein said joint or coupling mechanism has said pressure plungers on an output side and said at least one drive device on an input side.

6. The readjustment device according to claim 1, wherein said pressure plungers are oriented facing said plate-shaped workpiece in the working position, and said pressure plungers are moved upward, or pivoted laterally, with respect to the plate-shaped workpiece in the rest position.

7. The readjustment device according to claim 6, wherein said pressure plungers are oriented facing, perpendicular to, said plate-shaped workpiece in the working position.

8. The readjustment device according to claim 1, wherein said lower supporting device is configured to be decoupled from said upper pressure-exerting device.

9. The readjustment device according to claim 1, wherein said pressure plungers of said upper pressure-exerting device have a cylindrical housing in which a pressure pin is provided in a flexibly mounted manner, said pressure pin being guided so as to be able to dip into said cylindrical housing counter to a force when a clamping force is applied in the working position.

10. The readjustment device according to claim 9, wherein a preloaded force store element for applying the force is provided in said cylindrical housing.

11. The readjustment device according to claim 10, wherein said preloaded force store element is a disk spring assembly.

12. The readjustment device according to claim 1, wherein, in the working position, said pressure plungers bear against a stop which delimits an end position of said pressure plungers.

13. The readjustment device according to claim 1, wherein said at least one drive device is rotatably mounted on said holding element.

14. The readjustment device according to claim 1, further comprising an upper stroke drive element; and wherein said holding element of said upper pressure-exerting device has an interface for mounting on said upper stroke drive element.

15. The readjustment device according to claim 14, wherein:

at least one of said pressure plungers has a pin; and a readjustment position between said cylindrical housing and said pressure pin of said pressure plunger or between said upper stroke drive device and said interface of said upper pressure-exerting device can be set.

16. The readjustment device according to claim 14, wherein said interface is mounted so as to lie opposite to said pressure plungers.

17. The readjustment device according to claim 1, wherein, in order to receive at least two of said counter-bearings, said lower supporting device has a load-bearing frame or a supporting frame which is fastenable to a lower stroke drive apparatus.

18. The readjustment device according to claim 1, wherein said counter-bearings are in form of rigid counter-bearings or in a form of lowerable or resiliently flexible counter-bearings.

19. The readjustment device according to in claim 1, wherein said pivot axles are disposed at a spacing to one another on said holding element of said upper pressure-exerting device, such that said pressure plungers lie in a line in the rest position, and are disposed lying one behind the other, in a horizontally oriented configuration of said pressure plungers being provided.

20. The readjustment device according to claim 1, wherein said pivot axles are positionally fixed.

21. A method for readjusting a plate-shaped workpiece for processing in a machine tool, the method comprises the steps of:

positioning the plate-shaped workpiece in the machine tool on a workpiece rest, which extends along an X-Y axis, in the machine tool the plate-shaped workpiece is held and moved along the workpiece rest by means of a feed device which has a plurality of grippers, the workpiece rest being oriented with respect to a machine frame of the machine tool;

controlling an upper tool with an upper stroke drive apparatus and a lower tool with a lower stroke drive apparatus so as to be able to move along the machine frame;

processing the plate-shaped workpiece being positioned between the upper tool and the lower tool; and carrying out a readjustment process by means of a readjustment device according to claim 1 in order to readjust the plate-shaped workpiece between two processing cycles.

22. The method according to claim 21, wherein, at a beginning of the readjustment process, the plate-shaped workpiece is held in a fixed manner by the readjustment device and a gripping position of the grippers of the feed device with respect to the plate-shaped workpiece is released and the feed device is moved in relation to the plate-shaped workpiece by a readjustment travel and the plate-shaped workpiece is subsequently fixed in the gripping position, which has changed by the readjustment travel, by the grippers of the feed device.

23. The method according to claim 21, wherein, in a first working step of the readjustment process, the upper pressure-exerting device is moved to an upper end position with respect to the machine frame and at least two of the pressure plungers are subsequently transferred from the rest position to the working position.

24. The method according to claim 21, wherein, in a subsequent working step of the readjustment process, the upper pressure-exerting device is moved toward the plate-shaped workpiece and the plate-shaped workpiece is held in a clamped manner between the upper pressure-exerting device and the lower supporting device.

25. The method according to claim 21, wherein, after the plate-shaped workpiece has been fixed in a clamping manner by the readjustment device, the grippers of the feed device are opened and the plate-shaped workpiece is controlled to move away from the grippers of the feed device along a Y axis.

26. The method according to claim 25, wherein, in order to move the plate-shaped workpiece away from the grippers, a movement of the feed device and/or a movement of the workpiece rests is controlled.

27. The method according to claim 21, wherein, after the plate-shaped workpiece has been moved away from the gripper, the feed device is moved along a readjustment travel and the plate-shaped workpiece is subsequently controlled to move toward the grippers of the feed device.

28. The method according to claim 21, wherein, in a case of a first readjustment process, a movement travel when moving the plate-shaped workpiece away from the grippers is controlled to be greater than a movement travel for moving the plate-shaped workpiece toward the grippers.

29. The method according to claim 28, wherein, in a case of subsequent readjustment processes, an identical movement travel is controlled for moving the plate-shaped workpiece toward and away from the grippers.

30. The method according to claim 21, wherein, after a readjustment travel of the feed device has been passed through, the plate-shaped workpiece is held in a clamped manner by the grippers and at least the upper pressure-exerting device is moved along a Z axis and subsequently transferred to the rest position.

31. The method according to claim 21, wherein, during the readjustment process, process parameters of the feed device and/or of a stroke drive apparatus are reduced.

32. The method according to claim 31, wherein the process parameters are selected from the group consisting of: a movement speed, an acceleration and a jerk.

33. The method according to claim 21, which further comprises carrying out collision monitoring prior to and/or during the readjustment process.

34. The method according to claim 21, wherein, during the readjustment process, a clamping of the plate-shaped workpiece by the upper tool or a scraper and the lower tool is controlled in parallel and/or successively with respect to the readjustment device.

* * * * *